J. G. VINCENT.
MOTOR VEHICLE.
APPLICATION FILED OCT. 4, 1918.

1,358,482.

Patented Nov. 9, 1920.
2 SHEETS—SHEET 1.

Fig. 1

Inventor:
Jesse G. Vincent,

By Milton S. Hetts
Atty.

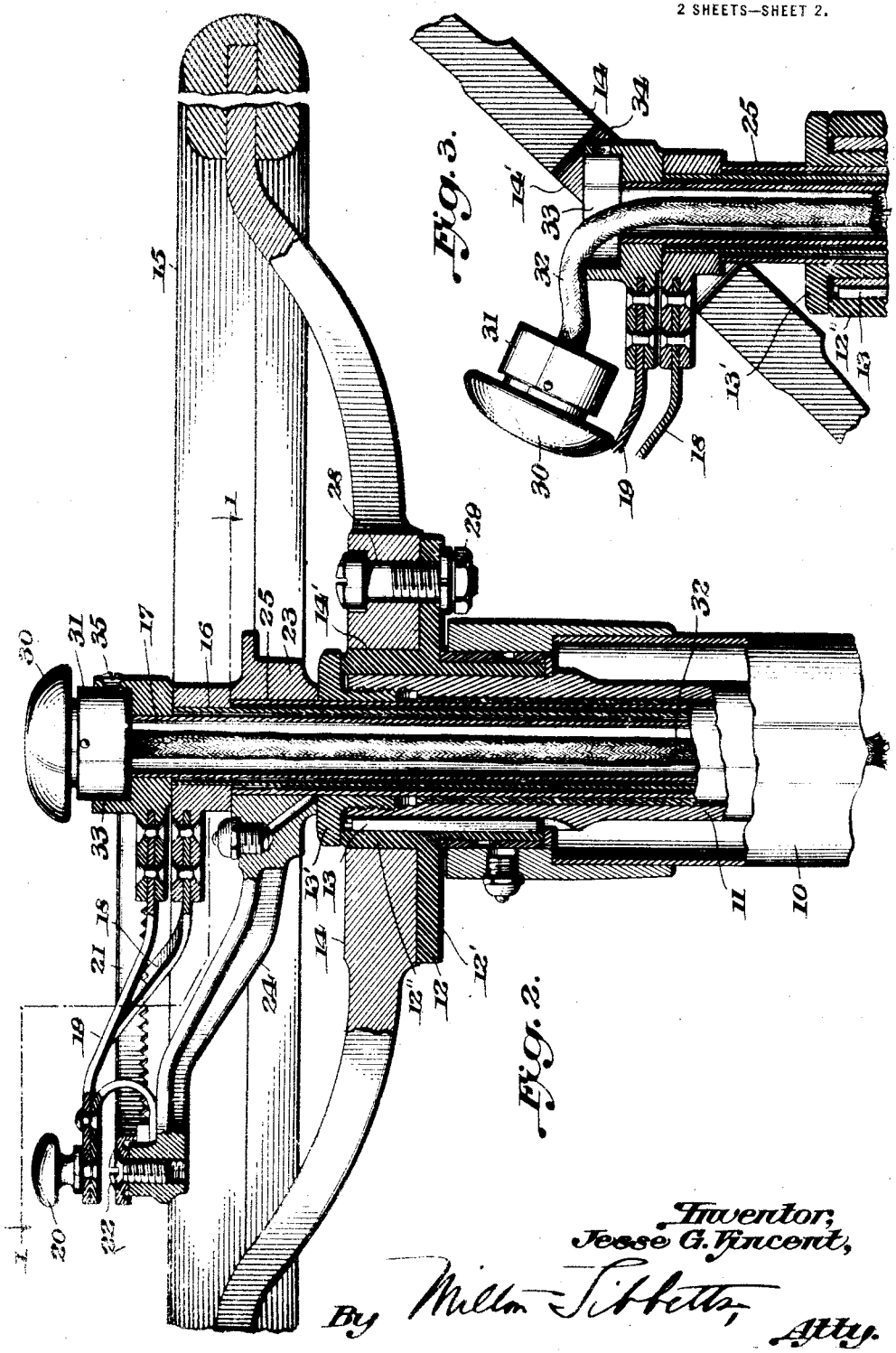

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,358,482.

Specification of Letters Patent.

Patented Nov. 9, 1920.

Application filed October 4, 1918. Serial No. 256,899.

*To all whom it may concern:*

Be it known that I, JESSE G. VINCENT, a citizen of the United States, and resident of Detroit, Wayne county, State of Michigan, have invented certain new and useful Improvements in Motor-Vehicles, of which the following is a specification.

This invention relates to motor vehicles and particularly to the steering mechanism thereof.

During the process of manufacturing motor vehicles, in which the several controls are assembled in what is called the steering column it is frequently necessary to detach the steering wheel from the steering shaft after the controls have been assembled. This is especially so in case of passenger vehicles of the higher grades, because the polished and varnished wood rims of the steering wheels become scratched or otherwise defaced before the vehicles leave the place of manufacture. In such cases trade ethics require the manufacturer to substitute a steering wheel that has not been defaced, or to re-finish the one that has been defaced. There are other causes from which the necessity arises for detaching the steering wheel, either before or after the vehicle leaves the place of manufacture, but for present purposes it will not be necessary to account for those causes. It will be sufficient, for present purposes, to state that the operation of detaching and attaching a steering wheel after the first complete assembling of the steering column equipment is a complicated proceeding, and requires considerable time, because the operating handles of the other controls, such as the spark control and the carbureter-throttle-control are usually mounted above the steering wheel and upon concentric hollow shafts. In conjunction with such equipment it is customary to provide an anchoring segment for holding the control, other than the steering wheel, in various positions of adjustment. This holding device is also arranged above the steering wheel and has added to the complication of the operation of attaching and detaching the steering wheels.

My present invention relates to a steering column assemblage such as that above referred to and it provides an improved combination of structures that enable the steering wheel to be attached and detached without dismantling, loosening or otherwise disturbing the operating handles of the other controls. One advantage of the improved structure is that the spark control and the carbureter-throttle-control may be completely assembled and used for testing the propelling motor prior to attaching the steering wheel that is to be used to equip the vehicle when the latter is shipped from the place of manufacture. In the meantime, temporary steering wheels may be attached for testing the steering mechanism without disturbing the other controls, and when the necessary testing has been done or when the vehicle is about to be shipped, the temporary steering wheel may be detached and the regular steering wheel substituted for it without taking apart the other controls.

Referring to the accompanying drawings:

Figure 1 represents a plan view partly in section, of a steering column assemblage embodying the present invention, the planes of view being substantially indicated by line 1—1 of Fig. 2;

Fig. 2 represents a sectional view in the plane indicated by the line 2—2 of Fig. 1; and Fig. 3 represents a section similar to Fig. 2 showing the hub portion of the steering wheel at an intermediate position of being slipped over the other controls.

The same reference characters indicate the same parts wherever they occur.

The outer casing or fixed post of a steering column is indicated at 10. The lower portion of this element is usually affixed to a gear casing (not shown). The steering shaft is indicated at 11, and its upper end extends above the fixed column 10 and is provided with an annular head 12. The steering shaft and head are affixed to each other so as to turn as a unit, the present structure including a key 13 and a hollow nut 13′ which threads into the upper end of the shaft. The head 12 has a flange part 12′ and a hub part 12″ forming a mounting for a detachable steering wheel, the hub of which is indicated at 14, and the rim at 15, and the hollow nut 13′ is made smaller than the periphery of the hub part 12″ so that the hub 14 of the steering wheel may slip over it in assembling the wheel.

The present assemblage includes two hollow shafts 16 and 17, which serve as controls for the carbureter throttle and for the spark adjustment respectively. These shafts are arranged one within the other and both extend through and above the steering shaft 11, the upper part of the shaft 17 extending above the upper end of shaft 16. Operating handles 18 and 19 are affixed to the upper parts of the control shafts 16 and 17 respectively and extend laterally therefrom. Each operating handle is provided with a finger-button or knob 20 to be grasped when it is desired to impart angular motion to the control. In accordance with the usual practice an anchoring sector 21 is provided to hold the handles 18 and 19 in various positions of adjustment. This sector, for present purposes, is detachable from the spider that carries it but is fastened to the legs of the spider by screws 22. The spider comprises two separate parts 23 and 24, the outer ends of the part 23 being connected to the ends of the sector 21, and the outer end of the part 24 being connected to the sector between the ends of the latter. Parts 23 and 24, conjointly, are formed to surround and clamp an angular sleeve 25, the spider being split into the two parts 23 and 24, as shown by Fig. 1, to enable the spider to be attached to and detached from the sleeve 25 without detaching either of the operating handles from their respective shafts. Clamp bolts 26, 26 extend freely through holes formed in the part 24, and their inner ends are provided with screw threads 27 for engagement with corresponding threads tapped in sockets formed in part 23. Sleeve 25 extends through the steering shaft, and its lower part is firmly secured to some convenient fixture (not shown) in order to hold the split spider and the sector 21 stationary to afford the desired anchorage for the operating handles 18 and 19.

The hub 14 of the steering wheel and the flange part of the steering shaft head 12 are bored to provide registering holes through which bolts 28 may pass. These bolts are provided with nuts 29 by which the bolts may be tightened to lock the steering wheel to the head of the steering shaft.

The nuts 29 and bolts 28 are easily accessible and permit quick detachment of the steering wheel. To remove the wheel it is only necessary to withdraw the bolts 28, detach and remove the two-part spider 23, 24, from the stationary sleeve 25, and slip the wheel off over the tubes 16 and 17 and their operating handles 18 and 19, the latter being brought close together for the purpose. In slipping the wheel off it is tilted somewhat, as shown at Fig. 3, the opening 14' of the hub of the steering wheel being of sufficient diameter for this purpose.

From the foregoing description it may be seen that the steering wheel may be removed and another one substituted for it without detaching or loosening the operating handles of the controls, the only necessary preliminary operation being to remove the sector 21 and spider 23, 24.

The drawings include a push-button 30, movably mounted in a switch base 31. The internal structure of this device is not shown but it may be assumed that it includes the usual terminals of a push-button switch. Flexible conductors extend from the switch through the hollow shaft 17 and are covered by a flexible casing 32. This electrical equipment may be used for any desired purpose such as operating a signal horn (not shown). The hub of operating handle 19 is formed with a socket 33 to receive the base 31 of the push-button, and a screw 35 locks the base therein. The removal of the complete push-button unit from its socket to the position shown in Fig. 3 enables the steering wheel to slip over the control shafts and their respective operating handles, the electrical conductors being long enough to enable the latter to be withdrawn somewhat from the upper end of the control shaft. When the parts are in this relation the hub of the steering wheel may be slipped freely over them, and the removal and replacing of the wheel may therefore be effected without disconnecting the push-button from the conductors.

Having thus described my invention, what I claim and desire to secure by Letters Patent is:—

1. In a steering mechanism, in combination, a hollow steering shaft, control shafts extending through and beyond the end of said steering shaft, control handles on said control shafts, a sector bracket arranged between the end of said steering shaft and said control handles and removable from its position without displacing said handles, and a steering wheel detachably secured to said steering shaft and formed with an opening large enough to permit removal of the steering wheel over the ends of said control shafts and said handles after the sector bracket has been removed.

2. In a motor vehicle steering mechanism, in combination, a hollow steering shaft having an annular head, a control shaft extending through said steering shaft and projecting above said head, an operating handle secured to and extending laterally from said control shaft, a steering wheel having a hub to co-act with said head, and means to secure said hub detachably to the head of said steering shaft, said hub being adapted to slip over said handle and the projecting portion of said steering shaft while the two latter are assembled.

3. In a motor vehicle steering mechanism, in combination, a hollow steering shaft having an annular head, an anchoring sleeve extending through and projecting above said shaft, a control shaft extending through and projecting above said sleeve, an operating handle secured to and extending laterally from said control shaft, means detachably secured to the projecting portion of said anchoring sleeve to hold said handle in various positions of adjustment, a steering wheel having a hub adapted to slip over said handle and the projecting portion of said steering shaft, and means to secure said hub detachably to the head of said steering shaft.

4. In a steering mechanism, in combination, a hollow steering shaft having an annular head, a plurality of hollow control shafts arranged one within another and extending through said steering shaft, operating handles secured to said control shaft respectively at the upper end of the latter, an electrical conductor extending through the inner one of said control shafts, a push-button switch connected to said conductor and arranged at the upper end thereof, a steering wheel having a hub adapted to slip over said operating handles and said switch while the handles are attached to their respective control shafts, and means to fasten said hub detachably to the head of said steering shaft.

5. In a steering mechanism, in combination, a hollow steering shaft having an annular head at its upper end, an anchoring sleeve extending through and above said shaft, a control shaft extending through and above said sleeve, an operating handle carried by and extending laterally from the upper part of said control shaft, a steering wheel having a hub adapted to slip over said operating handle and the upper part of said anchoring sleeve, a split spider comprising separable parts and adapted to clamp said anchoring sleeve between said head and said operating handle, and a sector detachably secured to said spider, to hold said operating handle in various positions of adjustment.

In testimony whereof I affix my signature.

JESSE G. VINCENT.